United States Patent
Chao (10) Patent No.: US 9,319,847 B2
(45) Date of Patent: Apr. 19, 2016

(54) METHOD AND APPARATUS OF MBMS-BASED CONTENT TRANSMISSIONS IN MACHINE-TYPE COMMUNICATIONS

(75) Inventor: Hua Chao, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 495 days.

(21) Appl. No.: 13/576,274

(22) PCT Filed: Feb. 8, 2010

(86) PCT No.: PCT/CN2010/070558
§ 371 (c)(1),
(2), (4) Date: Jul. 31, 2012

(87) PCT Pub. No.: WO2011/094951
PCT Pub. Date: Aug. 11, 2011

(65) Prior Publication Data
US 2012/0311101 A1    Dec. 6, 2012

(51) Int. Cl.
*H04L 29/06* (2006.01)
*H04W 4/06* (2009.01)
(Continued)

(52) U.S. Cl.
CPC ............. *H04W 4/06* (2013.01); *H04L 12/189* (2013.01); *H04L 12/5845* (2013.01); *H04L 51/10* (2013.01); *H04L 67/12* (2013.01); *H04L 12/5895* (2013.01); *H04W 4/005* (2013.01)

(58) Field of Classification Search
CPC ...... H04W 4/06; H04W 4/005; H04L 12/189; H04L 12/5845; H04L 12/5895; H04L 51/10; H04L 67/12
USPC .......................................................... 709/219
See application file for complete search history.

(56) References Cited

U.S. PATENT DOCUMENTS

2004/0029596 A1* 2/2004 Kim et al. .................... 455/458
2007/0067794 A1* 3/2007 Russell et al. ................ 725/25
(Continued)

FOREIGN PATENT DOCUMENTS

| CN | 1645798 A | 7/2005 |
|----|-----------|--------|
| CN | 101150773 A | 3/2008 |

(Continued)

OTHER PUBLICATIONS

Notice of Reason for Refusal for corresponding Japanese Patent Application No. 2012-552229, dated Oct. 29, 2013, 6 pages.
(Continued)

*Primary Examiner* — Brian J Gillis
*Assistant Examiner* — Amy Ling
(74) *Attorney, Agent, or Firm* — Fay Sharpe LLP (57) ABSTRACT

A method and apparatus of content transmission based on multimedia broadcast/multicast service (MBMS) in a machine type communication (MTC). A BM-SC receives a session start time from a MTC server; sends to a plurality of MTC devices a service announcement including the session start time; begins to establish MBMS bearers to the plurality of MTC devices when the session start time is reached; and transmits MTC service content from the MTC server to the plurality of MTC devices via the MBMS bearers. A MTC device receives a service announcement including a session start time therein; when the session start time is reached, wakes up to receive a notification about the MBMS bearers; and then receives MTC service contents transmitted via the MBMS bearers.

13 Claims, 3 Drawing Sheets

(51) Int. Cl.
*H04L 12/18* (2006.01)
*H04L 12/58* (2006.01)
*H04L 29/08* (2006.01)
*H04W 4/00* (2009.01)

(56) References Cited

U.S. PATENT DOCUMENTS

| | | | | |
|---|---|---|---|---|
| 2007/0133565 | A1* | 6/2007 | Hyun et al. | 370/395.52 |
| 2007/0275742 | A1 | 11/2007 | Zhang | |
| 2008/0253322 | A1* | 10/2008 | So et al. | 370/329 |
| 2009/0168683 | A1* | 7/2009 | Franceschini et al. | 370/312 |
| 2009/0190518 | A1 | 7/2009 | Kim et al. | |
| 2009/0264064 | A1* | 10/2009 | Hyun et al. | 455/3.06 |
| 2010/0165901 | A1* | 7/2010 | Kim | H04W 72/005 370/312 |
| 2010/0265867 | A1* | 10/2010 | Becker et al. | 370/312 |
| 2011/0128911 | A1* | 6/2011 | Shaheen | 370/328 |
| 2011/0274025 | A1* | 11/2011 | Hsu | 370/312 |
| 2012/0209951 | A1* | 8/2012 | Enns | H04L 29/08729 709/217 |

FOREIGN PATENT DOCUMENTS

| | | |
|---|---|---|
| JP | 2007-288259 | 11/2007 |
| JP | 2009-177807 A | 8/2009 |
| KR | 10-0617759 | 8/2006 |

OTHER PUBLICATIONS

Alcatel-Lucent Shanghai Bell, Alcatel-Lucent, "Discussion on Content-based Access Procedure for MTC," Document for: Discussion and Decision, Agenda Item: 9.7, Work Item / Release: NIMTC / Release 10, 3GPP TSG SA WG2 Meeting #77, Jan. 18-22, 2010, Shenzhen, China, TO S2-100162, 7 pages.

Ericsson, ST-Ericsson, "DSI for short sessions in LTE MBMS," Document for: Discussion, Agenda Item: 63.1, 3GPP TSG-RAN WG2 #67bis, Miyazaki, Japan, Oct. 12-16, 2009, R2-096790, pp. 1/6-6/6.

Alcatel-Lucent Shanghai Bell, Alcatel-Lucent, "Discussion on Collaborative Machine Type Communication (MTC) Device Monitoring," Document for: Discussion and Decision, Agenda Item: 9.7, Work Item / Release: NIMTC / Release 10, 3GPP TSG SA WG2 Meeting #77, Jan. 18-22, 2010, Shenzhen China, TD S2-100161.

Notice of Preliminary Rejection for corresponding Korean Application No. 10-2012-7023281, dated Mar. 31, 2014, 5 pages.

3GPP TR 23.888 V0.2.1 (Jan. 2010), Technical Report, 3rd Generation Partnership Project; Technical Specification Group Services and System Aspects; System Improvements for Machine-Type Communications; (Release 10), pp. 1-19.

Office Action of corresponding Chinese Application No. 201080063338.1, dated Jun. 4, 2014, 11 pages.

3GPP, "3$^{rd}$ Generation Partnership Project; Technical Specification Group Services and System Aspects; Service requirements for machine-type communications; Stage 1 (Release 10)," pp. 1-23, 3GPP TS 22.368 V1.1.1, Nov. 30, 2009.

International Search Report for PCT/CN2010/070558 date Nov. 18, 2010.

Notice of Reason for Refusal for corresponding Japanese Patent Application No. 2012-552229, dated Sep. 25, 2014, 5 pages.

* cited by examiner

METHOD AND APPARATUS OF MBMS-BASED CONTENT TRANSMISSIONS IN MACHINE-TYPE COMMUNICATIONS

FIELD

The present invention generally relates to field of machine-to-machine communication, and in particular, to methods and apparatus of a broadcast/multicast content transmission in a machine-type communication.

BACKGROUND

Recently, more and more attention has been paid to a Machine-to-Machine (M2M) communication in the industry. This type of communication does not necessarily involve human interaction, and in comparison with the current human to human communication, it is aimed to different market scenarios. Since M2M is an integration of a wireless communication and an information technology, it can be used in a bi-directional communication for such as collecting information, setting parameters and sending instructions remotely, and thus the M2M technology may have different application schemes such as security monitoring, vending machine, remote meter reading, and so on. In terms of the number of terminals, it is anticipated that the terminals for a human to human communication may only occupy ⅓ of the whole market of terminals in the future, and a larger amount of communication will be machine-to-machine communication traffic. In fact, the number of machines today is at least 4 times that of humans, and therefore M2M has an enormous market potential.

Accordingly, respective international standardization organizations are all conducting studies on the M2M communication. Among others, 3GPP has set up special work group to study what optimization and improvement need to be made on the network architecture and the critical technology to support M2M applications. In 3GPP, such machine to machine communication is referred to as Machine-Type Communication, and is defined in Release 10. Since MTC devices involves features comprising low cost of manufacture and development, a potentially very large number of MTC devices and possibly a wide distribution, but the traffic per device is little. In comparison with the matured human-to-human or human-to-machine communication mechanisms, the MTC communication mechanism needs many refinements, optimizations and improvements. Currently, the traffic demand of MTC is under a further refinement, while the work on the optimization of MTC network architecture and the improvement of the critical technology just begun.

Figure 1:
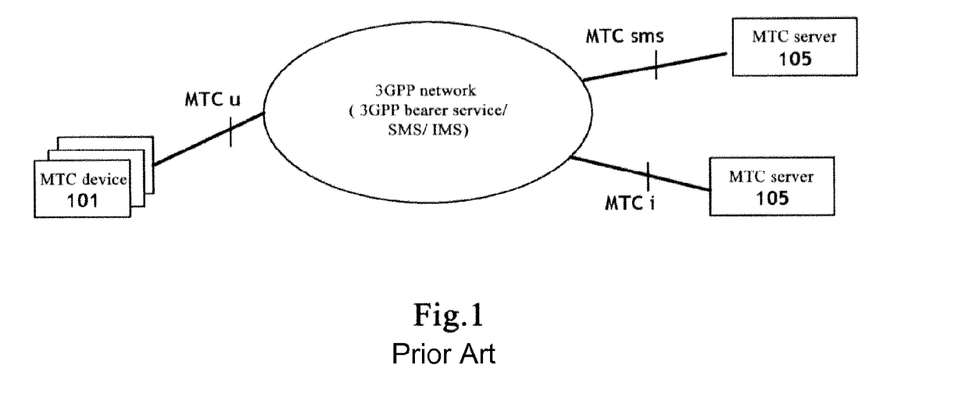
FIG. 1 shows a 3GPP service model for machine-type communication in the prior art.

FIG. 1 shows a 3GPP service model for a machine-type communication. The 3GPP network may provide transport and communication services optimized for the machine-type communication. For example, an end-to-end application between MTC devices 101 and MTC servers 105 or other MTC devices may utilize 3GPP bearer services, SMS and IMS etc. provided by the 3GPP network. As is known to those skilled in the art, the 3GPP network may utilize a technology such as GSM, GPRS, WCDMA, TD-SCDMA etc., but the invention is not limited thereto.

An MTC device 101 is a user equipment for a machine-type communication, which may communicate with MTC servers 105 or other MTC devices, via 3GPP network's PLMN (Public Land Mobile Network), for example. In addition. MTC devices 101 may communicate with other entities locally (wirelessly, via PAN or hardware), to acquire data for performing processes or communicating with MTC servers 105 or other MTC devices.

As shown in FIG. 1, an interface on an MTCu reference point provides MTC devices 101 access to the 3GPP network, to support the transport of traffics of the user plane and the control plane. Via the MTCu reference point, the MTC device 101 may be connected to, for example, UTRAN, E-UTRAN, GERAN, I-WLAN etc. For example, the MTCu reference point could be based on Uu, Urn, Ww and LTE-Uu interfaces.

A MTC server 105 is an entity for implementing services for MTC user. The MTC servers 105 may communicate with PLMN itself and communicate with MTC device 101 via PLMN. MTC servers 105 may also have an interface that can be accessed by MTC users. The MTC users may have one or more MTC servers 105 that communicate with MTC devices of the MTC users.

As shown in FIG. 1, MTC servers 105 are connected to the 3GPP network via an interface on MTCi or MTCsms reference point. Through the MTCi reference point, the MTC servers 105 can be able to connect to the 3GPP network and communicate with MTC devices via 3GPP bearer services or IMS. For example, MTCi could be based on Gi, SGi, and Wi interface, MTCsms is a reference point that the MTC server uses to connect the 3GPP network and thus communicates with MTC devices via SMS.

In many cases, a group of MTC devices receive same MTC service contents. For example, a group of vending machines receive the same common configuration information; on-board GPS devices from a same manufacturer receive the same update of GPS map software; one out of a group of MTC devices wishes to share service content (e.g., voice and/or audio, video, multimedia, stream etc) with multiple other MTC devices. In such case, using unicast transmission is not efficient for resource allocation, especially when the number of MTC devices is large. It is therefore desired to design architecture for enabling a MTC device to receive same contents based on broadcast/multicast.

What is readily conceived is the existing multimedia broadcast/multicast service (MBMS) technology. MBMS is a point-to-multipoint traffic bearer capability introduced in Release 6 by the international standardization organization 3GPP. MBMS implements point-to-multipoint traffic in which one content source transmits contents to multiple users, through network resource sharing, including the resource sharing of the mobile core network and access network, especially a resource sharing of the air interface. MBMS can not only realize a multicast and broadcast of plain-text and low-rate messages, but can also realize multicast and broadcast of high-rate multimedia traffics.

However, in existing MBMS technology, to receive service contents, a terminal needs to periodically detect a session start procedure of MBMS traffics. For low-cost MTC device, this will lead to considerable power consumption. Therefore, there is a need to provide architecture and solutions to solve these problems and meet requirements of MTC.

BRIEF DESCRIPTION OF THE INVENTION

To overcome the limitation of the foregoing prior art and other limitation that will be appreciated through reading and understanding the present specification, the invention provides a method and apparatus of MBMS-based content transmissions in machine type communication.

According to one aspect of the invention, there is provided a method of content transmission based on multimedia broadcast/multicast service (MBMS) in a machine type communication (MTC), comprising: receiving a session start time from a MTC server; sending to a plurality of MTC devices a service announcement including the session start time; beginning to establish MBMS bearers to the plurality of MTC devices when the session start time is reached; and transmitting to the plurality of MTC devices via the MBMS bearers, MTC service contents coming from the MTC server.

According to illustrative embodiments of the invention, the service announcement may be sent to the plurality of MTC devices via the MBMS bearer at fixed time point preconfigured to the plurality of MTC devices.

According to illustrative embodiments of the invention, a security ciphering code exchange may be performed with part or all of the plurality of MTC devices, such that the part or all of the plurality of MTC devices obtain a ciphering code for the MTC service contents.

According to illustrative embodiments of the invention, during the establishment of the MBMS bearers, a list of identifiers of MTC devices in the plurality of MTC devices that are expected to receive the MTC service contents may be contained in a notification about the MBMS bearers so as to be sent the plurality of MTC devices.

According to one aspect of the invention, there is provided a method for receiving contents based on multimedia broadcast/multicast service (MBMS) in a machine type communication (MTC), comprising: receiving from a MBMS service apparatus a service announcement including a session start time; waking up at the session start time, to receive a notification about MBMS bearers established for the session start time by the MBMS service apparatus; and receiving MTC service contents transmitted via the MBMS bearers.

According to illustrative embodiments of the invention, a fixed time point for receiving a service announcement may be pre-configured; and wakes up at the fixed time point to receive the service announcement via the MBMS bearers. Further, an idle state or a detaching state or a power off state may be entered after receiving the service announcement. An idle state or a detaching state or a power off state may be entered after receiving the MTC service contents transmitted via the MBMS bearers.

According to illustrative embodiments of the invention, a security ciphering code exchange may be performed with the MBMS service apparatus so as to obtain a ciphering code for interpreting the MTC service contents.

According to illustrative embodiments of the invention, the MTC service contents may come from other MTC devices.

According to one aspect of the invention, there is provided a method of content transmission based on multimedia broadcast/multicast service (MBMS) in a machine type communication (MTC), comprising: sending a session start time to a MBMS service apparatus, such that the MBMS service apparatus sends the session start time to a plurality of MTC devices via a service announcement; and when the session start time is reached, sending MTC service contents to the plurality of MTC devices via MBMS bearers established by the MBMS service apparatus.

According to illustrative embodiments of the invention, the MTC service content may be received from one of the plurality of MTC devices.

According to one aspect of the invention, there is provided a content transmission apparatus based on multimedia broadcast/multicast service (MBMS) in a machine type communication (MTC), comprising: a session information receiving means configured to receive a session start time from a MTC server; a means for receiving MTC service contents coming from the MTC server; and a MBMS bearer provision means configured to: send to a plurality of MTC devices a service announcement including the session start time; begin to establish MBMS bearers with the plurality of MTC devices when the session start time is reached; and transmit the MTC service content to the plurality of MTC devices via the MBMS bearers.

According to illustrative embodiments of the invention, there is provided a content receiving apparatus based on multimedia broadcast/multicast service (MBMS) in a machine type communication (MTC), comprising: a service availability detecting means configured to receive from a MBMS service apparatus a service announcement including a session start time therein; a MBMS bearer receiving means configured to: receive a notification about MBMS bearers established for the session start time by the MBMS service apparatus; and receive MTC service content transmitted via the MBMS bearers; and a state controlling means configured to instruct the MBMS bearer receiving means to wake up when the session start time is reached, so as to receive the announcement and the MTC service contents.

According to illustrative embodiments of the invention, there is provided a content transmission apparatus based on multimedia broadcast/multicast service (MBMS) in a machine type communication (MTC), comprising: a session information sending means configured to send a session start time to a MBMS service apparatus, such that the MBMS service apparatus sends the session start time to a plurality of MTC devices via a service announcement; and a MTC service content sending means configured to, when the session start time is reached, send MTC service contents to the plurality of MTC devices via MBMS bearers established by the MBMS service apparatus.

With the technical solution of the invention, service contents can be transmitted to MTC devices that need same contents based on broadcast/multicast, while there is no need for a MTC device to perform power wasted periodical wake up for detecting the session start procedure of MBMS traffics.

Other objects, features and advantages of the invention will become apparent from the following detailed description, accompany dependent claims and drawings.

LIST OF DRAWINGS

Embodiments of the invention will now be described in more detail with reference to accompany drawings, in which.

DESCRIPTION OF EMBODIMENTS

Various illustrative embodiments for realizing the invention will now be described with reference to accompany drawings, in which like reference number denotes like feature.

Figure 2:
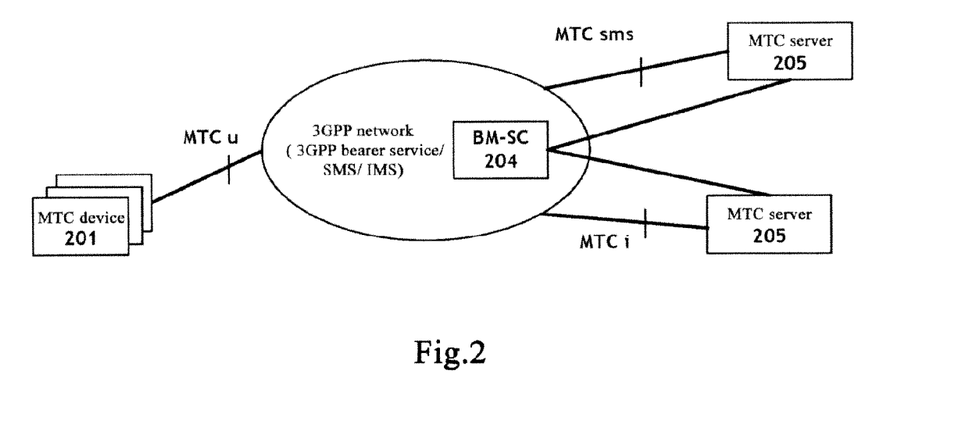
FIG. 2 shows a 3GPP service model for machine-type communication according to illustrative embodiments of the invention.

FIG. 2 shows a 3GPP service model for MTC according to illustrative embodiments of the invention. In this architecture, 3GPP MBMS (multimedia broadcast/multicast service)

bearer service is used as a bearer for MTC applications, where MTC servers 205 are looked as a content provider for MBMS and are connected to BM-SC (broadcast/multicast service center) 204. Contents provided by MTC servers 205 are broadcasted/multicasted to a plurality of MTC devices 201 via BM-SC 204.

The BM-SC is a core functionality entity of MBMS and is responsible for providing and managing MBMS traffics. For a content provider, it is an entry for MBMS traffic contents; and for a bearer network, it is responsible for authorizing and initiating MBMS traffics, and scheduling and delivering contents of the MBMS traffics. The 3GPP core network and radio network (namely, access network) will establish or release MBMS bearer in accordance with traffic requirements provided by the BM-SC, and meanwhile they are responsible for transmitting traffic contents from the BM-SC to downstream nodes via the established bearer.

In the following, although the present invention is discussed in terms of a 3GPP wireless communication network which is taken as an example of a wide area network for bearering MTC, a person skilled in the art will appreciate that, the present invention may utilize any type of currently known or future developed wireless communication network as a wide area network to provide transport and communication services for the machine-type communication, for example, a 3GPP2 network that utilizes the CDMA2000 technology.

A plurality of MTC devices may receive various MTC service applications with same contents, which may be categorized into two classes. One is a MTC service in which broadcast/multicast sessions occur at a fixed time, the other is a MTC service in which broadcast/multicast sessions occur at anytime necessary. For example, common configuration information may be sent to a plurality of MTC devices (such as vending machines), or software update (such as an upgrade of an on-board GPS map software) is downloaded for a plurality of MTC devices. In these cases, the downlink content transmission may occur at a fixed time configured by the network, for example, early in the morning or later in the night during which the network traffic is lower than the daytime. While for other cases, such as one out of a group of MTC devices wishes to share service contents (e.g., voice and/or audio, video, multimedia, stream etc) with multiple other MTC devices, the downlink content transmission may occur at anytime necessary. Therefore, there will be some differences between the broadcast/multicast schemes used for these two types of MTC applications.

Figure 3:
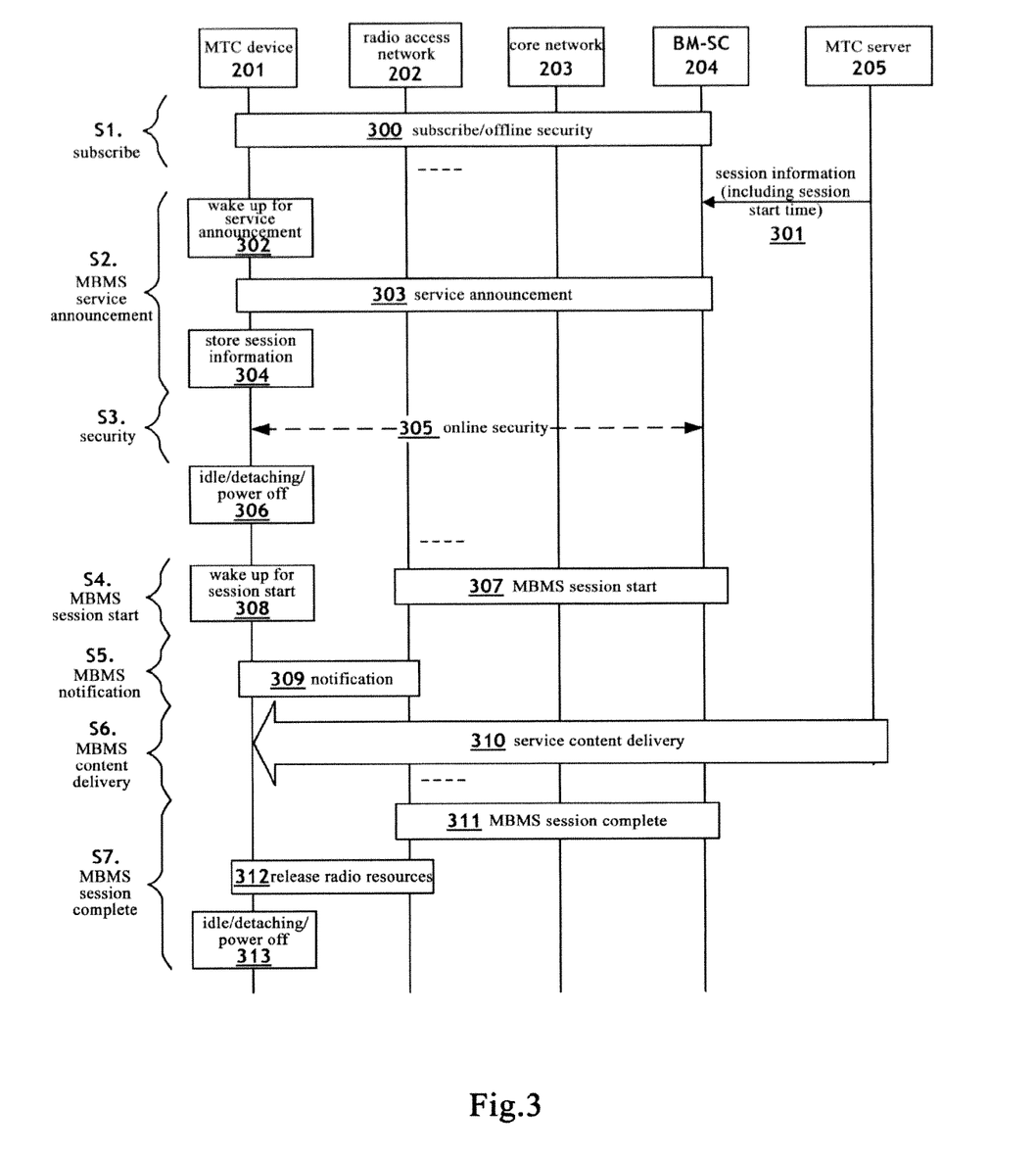
FIG. 3 shows a process of a MBMS-based downlink transmission of MTC service contents according to illustrative embodiments of the invention.

FIG. 3 shows an overall process of MBMS-based downlink content transmission of MTC according to illustrative embodiments of the invention. Unlike each MBMS phase in prior art, in order to save power of MTC devices and simplify corresponding processes, functions of part of MBMS phases have been optimized in the technical solution of the invention. Unless otherwise noted, respective technical features described hereinafter are applicable to the above two types of MTC application.

In the illustrative embodiment of the invention shown in FIG. 3, the process of MTC downlink content broadcast/multicast transmission approximately includes 7 phases. Hereinafter, contents of each phase will be roughly described first, and then the action flow of each phase will be described in detail.

During Subscription phase S1, relationship between a MTC device and a service provider will be established, to enable the MTC device to receive related MTC service contents via a MBMS bearer service.

Additionally, for the case in which MTC broadcast/multicast sessions occurs at a fixed time, an offline security process may be performed during the subscription phase, such that the MTC device is prepared with a ciphering code for interpreting MTC service contents to be received.

The second phase S2 (i.e. MBMS Service Announcement phase), is a MBMS service discovery procedure. This procedure makes the MTC device obtain related information of MBMS service that is about to be sent. For example, a range of MBMS service available to the MTC device, MBMS service identifier, a geographic range of the service, a start time of the service (especially for an intermittent service), etc. In addition, in the embodiment of the invention, specifically, the service announcement further includes related information about a session that is to be used to deliver the available services, including a session start time. The session related information may further include other session related information, so that the MTC device can receive notifications accurately and on time in a subsequent MBMS Notification phase S5. A session is a period of time in which a MBMS service is delivered, one service may contain a plurality of sessions during which UEs can receive service contents. Furthermore, in the embodiment of the invention, the session start time may be provided by the MTC server.

Optionally, for some MTC services, especially for MTC services for which content transmission may occur at any time necessary, there may be a Security phase S3. A MTC device that is interest in the announced MBMS services may acquire a ciphering code for interpreting the MTC service contents to be received, by exchanging security ciphering codes with the BM-SC.

When the session start time is reached, the process enters into a MBMS Session Start phase S4. In this phase, 3GPP network allocates resources for the MBMS traffics, and establishes MBMS bearers for delivering MTC service contents.

After MBMS bearers have been established, the process enters into a MBMS Notification phase S5. In this phase, a radio access network such as UTRAN notifies MTC devices of service content that is about to come. The function of the notification is to notify that air-interface resources of MBMS are ready, and tell MTC devices of all information for correctly receiving the service contents, for example, schedule information (including MBMS's repetition interval, location of resources allocated to traffic channel, etc.), modulation encode scheme, and so on.

Specifically, in an embodiment of the invention, the MBMS notification may includes a MTC service identifier for indicating that only MTC devices that have subscribed the service corresponding to that identifier can receive the subsequent broadcast/multicast contents. Furthermore, in an embodiment of the invention, the MBMS notification may also includes a list of MTC device identifiers for indicating that only MTC devices in that list can receive the subsequent broadcast/multicast contents.

Then, a MBMS content transmission is performed at phase S6, in which a corresponding MTC device 201 receives service contents from MTC server 206 in accordance with information acquired from the MBMS notification.

Next, at phase S7, the MBMS session is completed, and network resources and radio resources are released.

The scheme of MTC broadcast/multicast content transmission according to the invention will be described below in detail in conjunction with the flowchart shown in FIG. 3.

At step 300, MTC devices 201 subscribe MTC applications, for example, in the form of signing a contract with a service provider by a MTC user. The subscription information may be recorded in BM-SC 204.

In an embodiment of the invention, in step 300, the network provides the MTC devices with a ciphering code for interpreting service content to be received subsequently.

In an embodiment of the invention, in step 302, the MTC devices may also be configured with a time to wake up later to receive a service announcement. This time is a pre-determined (for example, by the network operator) fixed time point, for example, wake up at certain hour and certain minute and certain second every day or every month to receive a service announcement. The fixed time point may be configured into software means of the MTC devices in form of software, or may be hard coded into hardware chip or circuit of the MTC devices in the form of hardware or firmware, or may also be configured to the MTC devices in combinations of software and hardware.

In other embodiments of the invention, MTC devices may be configured with a time to wake up later to receive a service announcement at other phases. For example, this may happen before the subscription occurs, and the time is set by a manufacturer of the MTC devices when manufacturing the MTC devices. Alternatively, this may happen during the process after the subscription has occurred, for example, the configuration may be made during registrations of the MTC devices. Then, when the configured fixed time point is not reached, the MTC devices 201 may be in an idle state or a detaching state securely or even further in power off state.

When the configured fixed time point is reached, the BM-SC 204 broadcasts/multicasts a session start time to MTC devices 201 via a service announcement (step 303). Accordingly, MTC devices 201 wake up at the configured fixed time point (step 302), turn on their radio means to receive the service announcement from the BM-SC 204 including a session start time. Here, the term "wake up" refers to that MTC devices are becoming ready to receive service announcement. In terms of technical realization, "wake up" is a complex process. For example, the process may include making MTC devices turn on, turn on hardware devices such as RF circuit and successfully residing in a service cell, thereby being ready to receive a service announcement from the BM-SC 204.

The session start time is told to the BM-SC 204 by the MTC server 205. At step 301, for example, when the network wishes to perform software upgrade for MTC devices, MTC server 205 tells the BM-SC 204 the session related information for software upgrade that is about to begin, wherein the information includes a session start time therein.

The MTC devices 201 may detect whether there is a subscribed MBMS service by, for example, determining whether the service identifier in the service announcement is of the subscribed MBMS service. If the MTC devices 201 detected the subscribed MBMS service, then they will store a session start time of the corresponding service (step 304).

In addition, the operator may also consider to employ various other manners to implement the service announcement, such as via a cell broadcasting, a PUSH mechanism (e.g., WAP, SMS, IMS), URL (HTTP web page, FTP download etc), and so on. In practice, a user that has not subscribed a service can also obtain the MBMS service announcement to discover a MBMS service. To save network resources, in embodiments of the invention, it is preferred to send a service announcement via MBMS bearers at a pre-configured fixed time.

For some MTC services, the MTC devices may, after finding an interested MBMS service, acquire a security ciphering code for interpreting MTC service content to be received subsequently, via an online security interaction process (step 305).

Due to establishing MBMS bearers and UTRAN acquiring of traffic information, there must be a certain delay from the start of a session to the deliver of traffic contents of the first time, and accordingly there is often a significant difference between the session start time and the traffic start time. In the prior art, the MTC devices merely know the traffic start time, and can not accurately determine when the MBMS notifications on control channel will come. Thus in the prior art, MBMS terminals must frequently and periodically wake up and detect a corresponding control channel to discover the coming of a notification.

While in the technical solution of the present invention, after knowing an accurate session start time, at step 306, the MTC devices 201 may be in idle state or detaching state securely, or even further in power off state, rather than frequently and periodically wake up and detect a control channel as in the prior art. Thus, the power of a MTC device is significantly saved.

At step 307, the BM-SC 204 initiates a MBMS session at a predetermined session start time to establish MBMS hearers for delivering MTC service contents. Accordingly, at step 308, the MTC devices wake up again at the session start time, and receive notifications sent thereto by for example detecting a MBMS control channel. Here, the term "wake up" refers to that MTC devices are becoming ready to receive MBMS notifications. In terms of technical realization, "wake up" is a complex process. For example, the process may include making MTC devices turn on, turn on hardware devices such as RF circuit and successfully reside in a service cell, thereby being ready to receive notification from radio access network 202. Therefore, to be precise, a MTC device may begin to perform "wake up" operation actually before the session start time (for example, a few milliseconds ahead of the session start time) according to the session start time and its own condition (such as a current state of the device), so as to be ready to receive the expected notification at the session start time.

At step 309, once MBMS bearers have been established, a MBMS notification is sent to MTC devices via the radio access network 202. The notification may be dedicated to certain broadcast/multicast services and/or some device group. If the notification is dedicated to a service, then the notification may include a service ID therein; and if the notification is dedicated to certain MTC devices, the notification may include a list of MTC device IDs therein. The two differs in that, the former is used to wake up all terminals that have subscribed a service, such as making all vending machines update their software; while the latter is only used to wake up one or more MTC terminals, such as in a remote meter reading application, the network only requires water meters/electric meters/gas meters at certain building in certain area to report information.

Then, at step 310, MTC service contents are delivered from the MTC server 205 to MTC devices via MBMS bearers. At step 311, when a MBMS session is completed, the radio access network 202 and core network 203 will release the allocated resources. At the same time, in step 312, when the MTC devices 201 detect that session is completed, they will release resources allocated to that session. Thereafter, at step 313, the MTC devices may again enter into an idle state or a detaching state or even further in a power off state.

Figure 4:
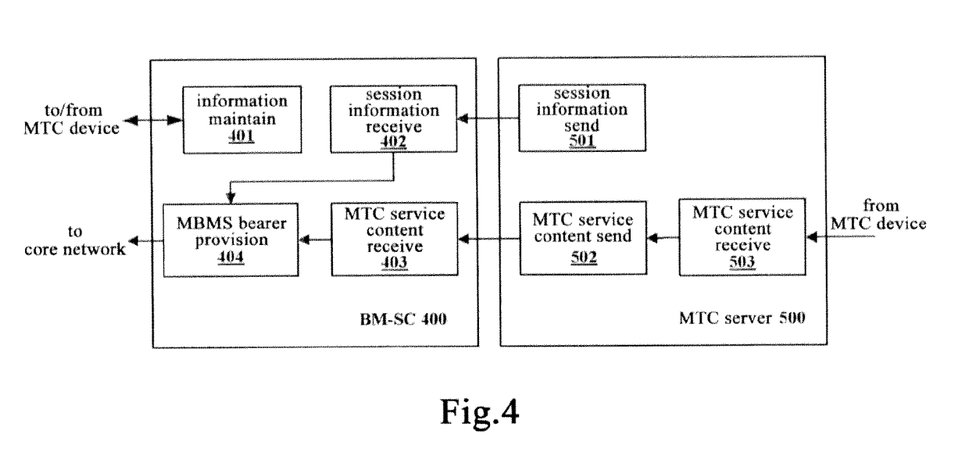
FIG. 4 shows a block diagram of MTC network side devices according to illustrative embodiments of the invention.

FIG. 4 shows functional structure block diagrams of a BM-SC 400 and a MTC server 500 according to embodiments of the invention, respectively. The BM-SC 400 may comprise a means 401 configured to maintain MTC service subscription information. The means may be further configured to effect online security on MTC devices.

MTC server 500 comprises a means 501 configured to send session related information including a session start time to the BM-SC 400. Accordingly, the BM-SC 400 comprises a means 402 configured to receive the session related information from the MTC server 500.

The MTC server 500 further comprises a means 502 configured to send MTC service contents to the BM-SC 400. Accordingly, the BM-SC 400 comprises a means 403 configured to receive MTC service contents from MTC server 500. In addition, the MTC service contents may also come from MTC devices. Thus, the MTC server 500 further comprises a means 503 configured to receive MTC service contents from MTC devices.

The BM-SC 400 further comprises a means 404 configured to provide MBMS bearer service for delivering session information and MTC service contents via a hearer network such as 3GPP. Wherein, when a MBMS bearer service is used in a session information provision, a session start time is delivered to MTC devices at a Service Announcement phase.

Figure 5:
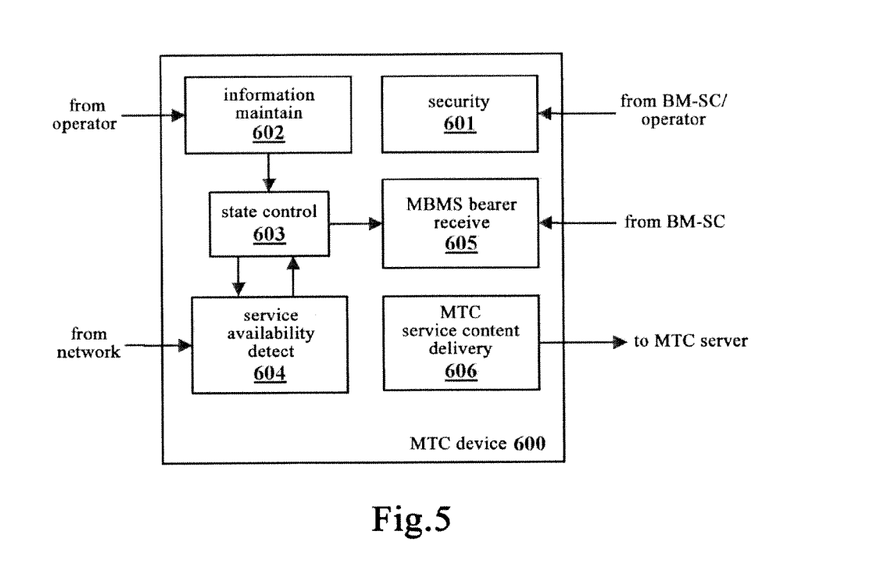
FIG. 5 shows a block diagram of a MTC device according to illustrative embodiments of the invention.

FIG. 5 shows a functional structure block diagram of a MTC device 600 according to illustrative embodiments of the invention. The MTC device 600 may comprise a means 601 configured to acquire security information. For example, the means 601 acquires security a ciphering code from operator (offline security) or BM-SC (online security), for interpreting the received MTC service contents.

MTC device 600 may further comprise a means 602 configured to maintain MTC service application information, MBMS service subscription information and the fixed time points from operator for receiving a MBMS service announcement. Then, the information maintaining means 602 may deliver the fixed time points to a state controlling means 603, so as to instruct a service availability detecting means 604 to wake up at the fixed time points to receive the service announcement via the MBMS bearers.

The state controlling means 603 is configured to receive a announced start time from the means 602 and a session start time from the means 604 that receives service announcement, and control the state of the MTC device 600 based on the announced start time and the session start time, such as to turn on or turn off radio, enter into an idle state or a detaching state or a power off state or wake up. The means 604 may be configured to wake up substantially at fixed time point based on the control of the controlling means 603 and receive service announcement information. If a subscribed or interested available MBMS service is detected, then the means 604 receives a session start time and delivers the session start time to means 603. Then, the MBMS bearer receiving means 605 wakes up at the session start time according to the control of the means 603 to receive MBMS control information (including MBMS notifications) and service contents.

In illustrative embodiments of the invention, the state controlling means 603 may be further configured to make the MTC device 600 configured to enter into an idle state or a detaching state or even further into a power off state after the means 604 has completed the above operations for receiving a service announcement. Additionally or alternatively, the state controlling means 603 may be further configured to make the MTC device 600 configured to enter into an idle state or a detaching state or even further into a power off state after the means 605 has completed the above operations for receiving service contents.

In addition, the MTC device 600 may further comprise a means 606 configured to provide MTC service contents to the MTC server.

While various aspects of the various example embodiments may be illustrated and described as block diagrams, flow charts, or using some other pictorial representation, it is well understood that these blocks, apparatus, systems, techniques or methods described herein may be implemented in hardware, software, firmware, special purpose circuits or logic, general purpose hardware or controller or other computing device, etc., or some combination thereof. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. A method of content transmission based on multimedia broadcast/multicast service (MBMS) in a machine type communication (MTC), comprising:
   receiving a session start time from a MTC server;
   sending to a plurality of MTC devices a service announcement including the session start time;
   beginning to establish MBMS bearers to the plurality of MTC devices when the session start time is reached; and
   transmitting to the plurality of MTC devices via the MBMS bearers, MTC service contents coming from the MTC server;
   wherein the service announcement is sent to the plurality of MTC devices via the MBMS bearers at a fixed time point preconfigured to the plurality of MTC devices; and
   at the fixed time point, waking up the plurality of MTC devices to receive the service announcement via the MBMS bearers.

2. The method of claim 1, wherein, during the establishment of the MBMS bearers, a list of identifiers of MTC devices in the plurality of MTC devices that are expected to receive the MTC service contents is contained in a notification about the MBMS bearers so as to be sent to the plurality of MTC devices.

3. A method for receiving contents based on multimedia broadcast/multicast service (MBMS) in a machine type communication (MTC), comprising:
   receiving from a MBMS service apparatus a service announcement including a session start time;
   when the session start time is reached, waking up to receive a notification about MBMS bearers established for the session start time by the MBMS service apparatus;

receiving MTC service contents transmitted via the MBMS bearers;

pre-configuring a fixed time point for receiving the service announcement; and at the fixed time point, waking up and receiving the service announcement via the MBMS bearers.

4. The method of claim 3, further comprising:

entering into an idle state or a detaching state or a power off state after receiving the service announcement or after receiving the MTC service contents transmitted via the MBMS bearers.

5. The method of claim 3, wherein, the MTC service content comes from other MTC devices.

6. A method of content transmission based on multimedia broadcast/multicast service (MBMS) in a machine type communication (MTC), comprising:

sending a session start time to a MBMS service apparatus, such that the MBMS service apparatus sends the session start time to a plurality of MTC devices via a service announcement; and when the session start time is reached, sending MTC service contents to the plurality of MTC devices via MBMS bearers established by the MBMS service apparatus;

wherein the service announcement is sent to the plurality of MTC devices via the MBMS bearers at a fixed time point preconfigured to the plurality of MTC devices; and at the fixed time point, waking up the plurality of MTC devices to receive the service announcement via the MBMS bearers.

7. The method of claim 6, further comprising:

receiving the MTC service contents from one of the plurality of MTC devices.

8. A content transmission apparatus based on multimedia broadcast/multicast service (MBMS) in a machine type communication (MTC), comprising:

a receiver configured to:
  receive a session start time from a MTC server; and
  receive MTC service contents from the MTC server; and
a processor configured to provision MBMS bearers, the processor being configured to:
  send to a plurality of MTC devices a service announcement including the session start time;
  begin to establish MBMS bearers to the plurality of MTC devices when the session start time is reached; and
  transmit the MTC service contents to the plurality of MTC devices via the MBMS bearers;
  wherein the service announcement is sent to the plurality of MTC devices via the MBMS bearers at a fixed time point preconfigured to the plurality of MTC devices; and
  at the fixed time point, waking up the plurality of MTC devices to receive the service announcement via the MBMS bearers.

9. The apparatus of claim 8, wherein, the processor is further configured to: during the establishment of the MBMS bearers, include a list of identifiers of MTC devices in the plurality of MTC devices that are expected to receive the MTC service contents in a notification about the MBMS bearers so as to be sent to the plurality of MTC devices.

10. A content receiving apparatus based on multimedia broadcast/multicast service (MBMS) in a machine type communication (MTC), comprising:

a processor configured to:
  receive from a MBMS service apparatus a service announcement including a session start time therein;
  receive a notification about MBMS bearers established for the session start time by the MBMS service apparatus; and
  receive MTC service contents transmitted via the MBMS bearers;
  instruct the MBMS bearer receiving means to wake up when the session start time is reached, so as to receive the announcement and the MTC service contents;
  pre-configure a fixed time point for receiving the service announcement; and
  at the fixed time point, wake up and receiving the service announcement via the MBMS bearers.

11. The apparatus of claim 10, further comprising a non-transitory computer-readable medium configured to be pre-configured with a fixed time point for receiving the service announcement;

wherein the processor is further configured to instruct the service availability detecting means to wake up at the fixed time point to receive the service announcement via the MBMS bearers.

12. The apparatus of claim 10, wherein the processor is further configured to, after receiving the service announcement, or after receiving the MTC service contents transmitted via the MBMS bearers, make the content receiving apparatus enter into an idle state or a detaching state or a power off state.

13. A content transmission apparatus based on multimedia broadcast/multicast service (MBMS) in a machine type communication (MTC), comprising:

a processor configured to:
  send a session start time to a MBMS service apparatus, such that the MBMS service apparatus sends the session start time to a plurality of MTC devices via a service announcement; and
  when the session start time is reached, send MTC service contents to the plurality of MTC devices via MBMS bearers established by the MBMS service apparatus;
  wherein the service announcement is sent to the plurality of MTC devices via the MBMS bearers at a fixed time point preconfigured to the plurality of MTC devices; and
  at the fixed time point, waking up the plurality of MTC devices to receive the service announcement via the MBMS bearers.

* * * * *